United States Patent

[11] 3,554,266

| [72] | Inventors | James L. Baird<br>Winchester;<br>Leo J. Monty, Reading, Mass. |
|---|---|---|
| [21] | Appl. No. | 828,928 |
| [22] | Filed | May 29, 1969 |
| [45] | Patented | Jan. 12, 1971 |
| [73] | Assignee | Artisan Industries Inc.<br>Waltham, Mass.<br>a corporation of Massachusetts<br>Continuation-in-part of Ser. No. 736,997,<br>June 14, 1968. |

[54] METHOD FOR REMOVING VISCOUS MATERIAL
7 Claims, 6 Drawing Figs.

[52] U.S. Cl. ................................................. 159/49,
159/6, 159/2; 103/117
[51] Int. Cl. ..................................................... B07d 1/22
[50] Field of Search ......................................... 159/6W,
6WH, 49, 17VS, 13A; 103/117

[56] References Cited
UNITED STATES PATENTS
| 1,420,648 | 6/1922 | Mabee ......................... | 159/6WH |
| 3,201,365 | 8/1965 | Charlesworth et al. ........ | 159/49 |
| 3,211,209 | 10/1965 | Latinen et al. ................ | 159/6W |
| 3,357,478 | 12/1967 | Donovan et al. .............. | 159/6WH |
| 3,428,530 | 2/1969 | Fauche et al. ................ | 203/72 |
| 3,443,622 | 5/1969 | Monty ......................... | 159/6WH |

OTHER REFERENCES
Artisan Industries Inc., Publication Bulletin No. 4011 p2 printed in 1967 publicized June 10, 1967, 159-6WH

*Primary Examiner*—Norman Yudkoff
*Assistant Examiner*—J. Sofer
*Attorneys*—Richard P. Crowley, Philip G. Kiely and Richard L. Stevens

ABSTRACT: A horizontally axised rotary wiped thin-film type evaporator for the processing of viscous material having within the product outlet of the evaporator an auger screw in combination with a screw pump. The auger screw removes viscous thixotropic material from the evaporator and transfers it to the screw pump which discharges the material.

PATENTED JAN 12 1971

3,554,266

INVENTORS
JAMES L. BAIRD
LEO J. MONTY

Crowley, Kiely & Stevens
ATTORNEYS

METHOD FOR REMOVING VISCOUS MATERIAL

This application is a continuation-in-part of Ser. No. 736,997, filed Jun. 14, 1968.

BACKGROUND OF THE INVENTION

In the processing, treating or handling of organic resins, polymers or solutions, it is often desirable to remove a solvent or liquid material from a resin, solution, emulsion, slurry, suspension or mixture. One means to accomplish the removal of a solvent or liquid material is through the use of thin film technology. That is, a thin film of the material to be concentrated is placed on the inner wall of a closed processing chamber to provide a surface for evaporation. Normally about this chamber is a heat exchange jacket to introduce heat into the thin film thereby evaporating the solvent as desired. The thin film is generally placed on the walls of the chamber by means of rotor blades or the like. The edges of which are spaced slightly apart from the interior wall of the chamber.

In the processing of materials in thin film apparatus, the feed material to be concentrated is generally, introduced into one end of the evaporator and the product removed from the other end, and the vapor created by the evaporation of the solvent is withdrawn either from the product end of the evaporator or from the feed end depending upon whether the vapor flow is countercurrent or concurrent.

The material being processed generally forms a thin film between the peripheral edges of the rotor blades and the interior wall of the chamber and as the material moves from the feed and/or upstream end of the evaporator and toward the product and/or downstream end of the evaporator the concentration of the material and therefore the viscosity increase. Also a thin fillet of material advances ahead of the leading edges of the rotor blades. When the fillet moves beyond the ends of the rotor blades it will flow downwardly by gravity. When this occurs, some of the material is caught in the vapor flow path and moves into the vapor chamber and some will fall and accumulate on the rotor shaft. With some materials in particular, the nonagitation increases the viscosity, and the flow of the material out the product outlet is inhibited. Accordingly, with viscous material it is preferable to keep it in an agitated condition and remove it prior to passing beyond the ends of the rotor blades.

In those horizontally axised thin film type apparatus such as an evaporator, materials which become very viscous during processing or upon discharge such as resins to be desolventized are extremely difficult to remove from the evaporator or processing section effectively. This is particularly true of non-Newtonian or thixotropic materials, that is, materials which increase significantly in viscosity when in a nonfluid or nonagitated state.

As the materials are processed the agitation of the material is maintained by the action of the blades wiping the material on the chamber wall. However, when the viscous materials particularly the thixotropic materials approach and move into the product outlet of the evaporator they increase significantly in viscosity thereby making the removal of the materials from the evaporator difficult.

One method proposed to overcome this problem is to place an extruder for conveying viscous material from the chamber at substantially a right angle to the rotor axis thereby removing the viscous material accumulated on the cutout section of the rotor blades, (see for example U.S. Pat. No. 3,357,478). This arrangement is generally satisfactory for many product materials such as those having a viscosity of up to about 80,000 centipoise. However, for materials having viscosities over about 80,000 centipoise the action of the extruder screw may not be enough to keep then sufficiently agitated, until discharged.

Another method proposed to aid in the removal of viscous materials from thin film evaporation apparatus is to place a ring just beyond the ends of the rotor blades at the product end to prevent viscous materials from traveling down the rotor shaft. A doctor blade or scoop removes the material accumulating about the outer peripheral edge of the ring and cuts it away into the product outlet, (see for example U.S. Pat. No. 3,357,479). However, often a problem still remains for the types of materials as described above to remove them rapidly and effectively from the product outlet after they have been doctored off the outer edge of the ring element.

SUMMARY OF THE INVENTION

We have discovered a new and improved method and apparatus for the removal of viscous material from thin film evaporators. Our invention comprises a horizontally axised rotary thin film evaporator having a feed inlet for the introduction of feed materials and an outlet for the removal of product materials. Rotor blades are secured to the rotor axis and are generally, radially, and coaxially arranged therefrom and extend to a close generally uniform relationship with the interior wall of the processing chamber. The downstream ends of the rotor blades may be just prior to or overlapping the product outlet.

Extending into or adjacent the processing chamber and located within the product outlet is an extruder screw such as an auger. The auger functions in combination with a positive displacement rotary-type pump such as a screw pump to aid in the rapid removal of the viscous material. The auger is adapted to transfer the material from the processing chamber and to the screw pump. That is, the auger maintains the product material in a continuous fluid or agitated condition thereby permitting its transfer and provides a head for the screw pump. This allows the screw pump to maintain a seal and move the material rapidly out of the evaporator product outlet. Also the auger in combination with the screw pump may be used in combination with vertical or inclined axised evaporators.

The rate of recovery of thixotropic materials, that is, rate of actual increase viscosity after it is no longer in an agitated state will generally determine the location of the auger in the processing chamber. That is, it may be located directly adjacent to the peripheral edges of the rotor blades, slightly beyond the ends of the rotor blades or extend into the processing chamber. Further, the screw pump may be in line with the axis of the auger or it may be perpendicular thereto.

As described above, this invention is particularly applicable for the removal of viscous material having viscosities of over about 80,000 centipoise. Also it is particularly suited for the removal of thixotropic materials and obviously it includes but is not limited to removing all type of viscous materials such as pseudo plastic, Bingham plastics, dilatent plastics etc. and of course Newtonian materials which have a high viscosity. Viscosities in this range and thixotropic materials may often be found in the processing of organic resins or polymers wherein it is often desirable to remove a solvent or liquid material from a resin, solution, emulsion, slurry, suspension or mixture. However, it is particularly found useful in the processing of resinous or polmeric or elastomeric materials such as vinyl resins like vinyl short-chained fatty acids, etc., and vinyl acetates such as polyvinyl acetate and its resinous hydrolysis products.

DESCRIPTION OF THE PREFERRED EMBODIMENTS

Figure 1:
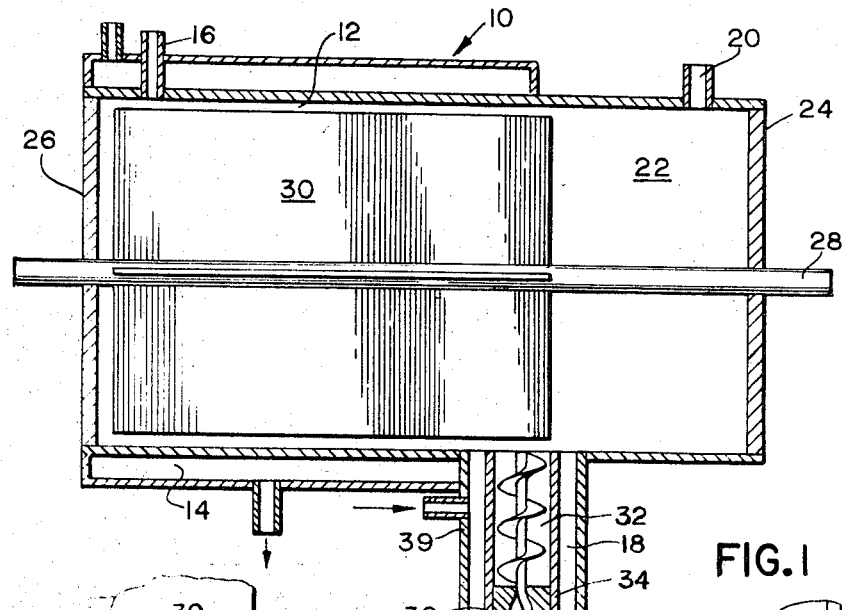
FIG. 1 is a schematic longitudinal section through a cylindrical, rotary wiped thin film evaporator.

FIG. 1 shows a horizontal-axised, cylindrical-type evaporator 10, comprising a closed cylindrical chamber 12 having interior walls and surrounded on all or part of its length by a temperature control jacket 14, which is adapted for the introduction of a heating or cooling heat exchange fluid such as steam, cold water and the like. The chamber 12 is further characterized by a feed inlet 16 for the introduction by pump, gravity or vacuum of a feed material to be processed through the evaporator, a product outlet or discharge nozzle 18 at the opposite end thereof for the removal of the product material, and a vapor outlet 20, which vapor outlet extends into a vapor chamber 22 adjacent the product end of the evaporator 10. Closing heads 24 and 26 are secured to either end of the chamber 12 and support a horizontally inclined central-axised, tubelike rotor 28, which extends from the one end of the other of the chamber 12 through the vapor chamber 22. The rotor 28 is driven by a motor or other means (not shown) and generally extends outwardly from each end of the closing heads.

Extending axially outward from the rotor shaft are a plurality of generally four or more radial rotor blades 30 the blade tips of which extend into a small, but generally uniform, closely spaced relationship with respect to the interior walls of the chamber 12, so that upon rotation of the rotor shaft 28 the rotor blades 30 provide a thin, wiped or turbulent film of the processed material on the heated interior wall of the chamber 12.

Disposed within the product outlet 18 and extending upwardly toward the processing chamber 12 is an auger 32, adapted to transfer the material from the chamber 12. Disposed directly below the auger 32 and axially aligned therewith is a screw pump 34 which comprises a rotor 37 and a stator 36. The auger and the screw pump are driven by motors or other means (not shown). The auger 32 transfers and continuously agitates the viscous material from the chamber 12 to the screw pump 34. The screw pump 34 through the action of the rotor 37 moves the material out of the product outlet 18. The screw pump 34 and the auger 32 may be operated by the same drive means or each operated by a separate drive means. With separate drive means the auger and screw pump may be operated independently at different speeds. Also any positive displacement type pump may be used such as a piston type (radial or axial) or rotary type (gear or vane) etc., all as described in the Encyclopedia of Chemical Process Equipment, William G. Mead, Rheinhold Publishing Corporation, New York, 1964, pp 775—778. About the product outlet 18 is a heat-exchange jacket 39 to control the temperature of the product material being removed.

In the operation of our evaporator a vinyl resin to be concentrated such as polyvinyl acetate is introduced into the feed inlet 16 by gravity, under vacuum or pump while a relatively nonvolatile viscous product material is withdrawn through the product outlet 18, and the vaporized material withdrawn through the vapor outlet 20. Of course, if desired, other or additional vapor product outlets and feed inlets may be used. The rotor shaft 28 and the rotor blades 30 are rotated at high speed during the processing to form a thin film of the feed material against the interior wall of the chamber 12 and a heat exchange fluid such as steam introduced into the temperature control jacket 14, whereby the thin film on the interior wall is placed in a heat exchange relationship with the steam in the heating jacket to effect an evaporation of relatively volatile component of the resin. As the polyvinyl acetate is processed the vapor of more volatile material passes into the vapor chamber 22 and out the vapor outlet 20 and the viscous or product material is processed toward the product outlet 18. As the material moves toward the product outlet it is engaged by the auger 32 while in agitated thin film form and moved from the processing chamber 12 down to the screw pump 34. This provides for continuous agitation of the product material to prevent or inhibit any increase in viscosity and further provides a head for the screw pump 34. Upon reaching the upstream end of the rotor 36 in the screw pump, the material is then displaced through the stator 38 and out the product outlet.

Figure 2:
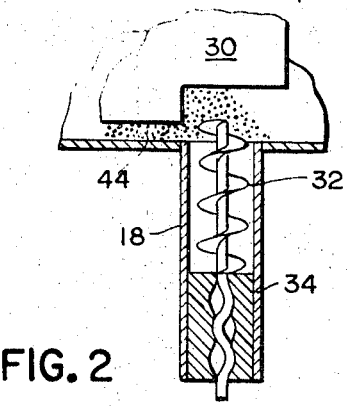
FIGS. 2, 3, 4 and 5 are alternative embodiments of our invention is sectional views. recovery

FIG. 2 shows an alternative embodiment of my invention wherein the rotor blades 30 extend over the product outlet 18 and the downstream ends of the rotor blades adjacent the product outlet are characterized by cutout segments therein. This provides a thicker thin film of material 44 at the discharge end and allows the auger 44 to extend into the rotor blade section. This embodiment is preferable where the material being processed has a fast rate of recovery. That is, the viscosity increases significantly in a short period of time when there is no agitation.

Figure 3:
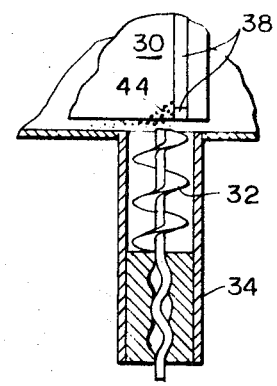

FIG. 3 is a further alternative embodiment of my invention wherein a continuous ring 38 is secured about the rotor blade edges such as described and shown in U.S. Pat. No. 3,349,828 which is hereby incorporated by reference in its entirety. This creates a greater buildup of material 44 about the product outlet 18. However, if desired, instead of continuous ring 38, a wedge or similar projection may be used such as described in U.S. Pat. No. 3,348,600, to create an increased fillet of material adjacent the product outlet 18.

Figure 4:
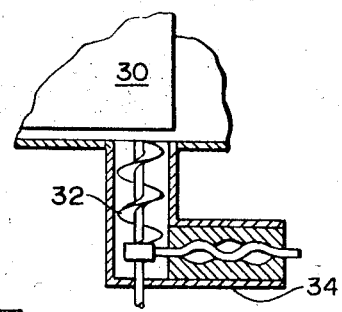

FIG. 4 is a further embodiment of my invention similar to that described and shown in FIG. 1 wherein the screw pump is at a right angle to the auger rather than in line therewith.

Figure 5:
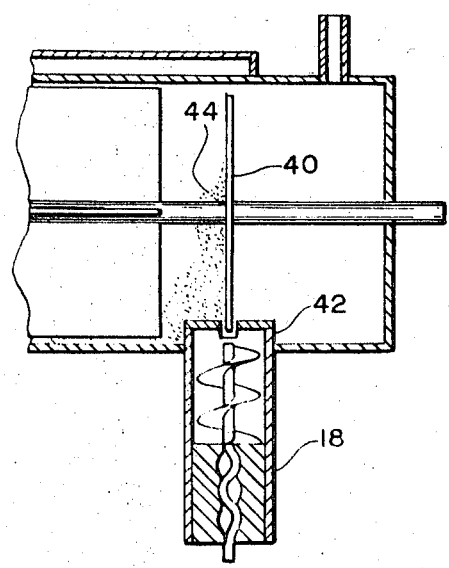

FIG. 5 shows the use of our invention in combination with the invention described and shown in U.S. Pat. No. 3,357,479, which is hereby incorporated by reference in its entirety. More specifically, affixed to the rotor shaft 28, beyond the ends of the rotor blades 30 and adjacent the product outlet 18 is a ring element 40 which is secured to and circumferentially surrounds and extends radially outward from the rotor shaft 38 to prevent or inhibit the flow of viscous materials down the rotor shaft. The ring 40 is generally spaced apart from the end of the rotor blades 30 by a predetermined amount, so that viscous material illustrated as material 44 accumulates behind it. The spacing may be varied as desired depending upon the material being processed, the speed of rotation and other factors. The ring elements extends the proper radius to enable it to be an effective barrier in preventing the flow of viscous material down the shaft, but no so great to inhibit the vapor flow path between the closed processing chamber 12 and the vapor chamber 22.

An integral part of the product outlet 18 is a scoop or blade or conveying means 42 which projects toward the ring element 40 to "doctor off" or remove any excess viscous product material which during operation accumulated behind or in back of the ring element and attempts to move over the ring 40. The scoop 42 projects from the edge of the product outlet 18 within the processing chamber. The base of the scoop element is tube shaped and the outer wall of the tube shaped portion of the scoop element is flush with the inner wall of the product outlet 18. The upper portion of the scoop element is characterized by a cover or lid over the tube portion and which lid extends about halfway around the circumference of the tube portion. The lid rises up from the edge of the tube toward the center of the opening in the tube at an angle about 15°. From the product outlet 18 the scoop 42 just reaches, but does not touch the edge of the ring element 40. The edge of the scoop 42 leads into the direction of rotation of the ring element, and as viscous material tends to build up or accumulate behind the ring element 40, it is doctored off or cut away by the leading sharp edge of the scoop 42. The viscous resin material which is cut away from behind the ring then falls or drops into the product outlet or discharge nozzle.

Within the product outlet 18 is the auger 38 and the screw pump 34. Materials removed from behind the ring 40 drops onto the auger and is removed from the evaporator with the product material.

It is obvious that any of the embodiments herein described and shown may be used in any combination thereof and that other obvious designs apparent to those skilled in the art are within the scope of this invention. Also, the invention may be utilized in other wiped-film evaporators such as vertical, tapered, and inclined-axised evaporators.

Although our invention has been described in reference to the recovery of the polyvinyl acetate from a solvent, it may be used for the recovery of other resinous materials from a solvent. Such resinous materials may include: olefinic resins such as polyethylene, polyproplyene; vinyl resins such as vinyl polymers and copolymers like polyvinyl chloride, polyvinyl acetate, polyvinyl alcohol etc.; and copolymers of vinyl esters like vinyl acetate with vinylchloride. These resins often have viscosities ranging from about 15,000 Hz. upwards to about 500,000 Hz., for example 25,000 —250,000 Hz.

One problem generally associated with the polymerization of a vinyl chloride monomer to polyvinyl chloride is the polymeric residue left in the reactor after a single operation or a series of operations. This residue after a period of time accumulates and must be removed periodically. Some current methods for the removal of the polyvinyl chloride from the reactor include chipping the polyvinyl chloride from the reactor walls or spraying the polyvinyl chloride with a high-pressure water stream. Solvents have been used to dissolve the polyvinyl chloride and then the solvent is recovered in a separate operation. However, normally only about 70 percent of the solvent is recovered because it is difficult to recover more than 70 percent of the solvent since the viscosity of the residue in the recovery operation begins to increase so significantly that present equipment utilized in the recovery of the solvent is unable to handle the high viscosities. Thus present processes are uneconomical and unattractive.

Figure 6:
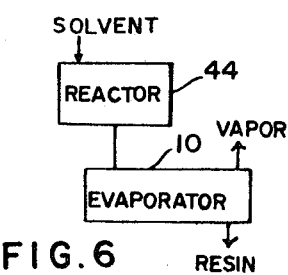
FIG. 6 is a schematic illustration of the invention employed in the particular recovery system.

Referring to FIG. 6, in an alternative embodiment of our invention a reactor 44 for the polymerization of polyvinyl chloride is shown. When sufficient residue of polyvinyl chloride has built up in the reactor a solvent for the polyvinyl chloride residues such as tetrahydrofuran is added to the reactor at a temperature between 100 and 180° F., say between about 120 and 150° F. After a period of time when the polyvinyl chloride has dissolved in the tetrahydrofuran, the solution is introduced into the inlet of the evaporator 10 and placed in thin film form on the internal wall of the evaporator. Referring to FIG. 1, the tetrahydrofuran is evaporated from the thin film and is discharged through the vapor outlet 20 as a vapor stream. The polyvinyl chloride as a viscous material in thin film form flows to the product outlet 36. There the viscous material is removed from the product outlet by the auger 32 and then the screw pump 34 in a similar manner as described before for the removal of the polyvinyl acetate. Processed in this manner the solvent recovery is typically over 99 percent. Thus, our invention provides an economical and efficient operation for cleaning of resin reactors and for the removal of the tetrahydrofuran from the polyvinyl chloride.

Although this embodiment has been described in reference to the removal of the residual polyvinyl chloride from a reaction vessel and the subsequent removal of tetrahydrofuran from the polyvinyl chloride resin, it is obvious that other resinous materials of high viscosity may be removed by a suitable solvent which is compatible with the resinous material. These solvents may include: cyclic compounds such as furan, like tetrahydrofuran - pyrrolidones, such as n - methypyrolidone; straight chain hydrocarbons such as n-heptane; ketones like methylethyl ketones, alcohols like isopropanols, esters like amylacetate, ethers; and halogenated solvents such as chlorinated hydrocarbons like ethylene dechloride, methylene chloride and carbon tetrachloride; and suitable dilutents Such solvents include those materials which form solutions, suspensions, emulsions, slurrys and mixtures with the resinous material. Also vessels other than reaction vessels may have residual materials removed which materials may have accumulated from prior operations, in a similar manner as described above.

We claim:

1. A method of the recovery of a resinous material of high viscosity from a solvent in a thin film evaporator which comprises:
   a. placing the solvent in agitated generally uniform wiped thin film form on the interior surface of a heated surface of revolution;
   b. evaporating the solvent from the thin film to form a vapor stream of the solvent and a thin film of viscous material;
   c. removing the vapor stream from the evaporator;
   d. conveying the viscous material from the evaporator into a product outlet; and
   e. positively displacing the viscous material from the product outlet;
   d. flowing the agitated uniform thin film from one toward the other end of the evaporator and into a product outlet, closely adjacent to the terminal portion of the wiped film;
   e. agitating continuously the material from one to the other end of the product outlet by:
      1. extruding the material through an initial portion of said product outlet, by means of an Archimedean screw thereby maintaining a pressure head on the material for the intake of an immediately adjacent positive displacement pump; and
      2. displacing positively without back slippage the material through the terminal portion of the product outlet to discharge the material from the product outlet.

2. The method of claim 1 which includes cleaning a reaction vessel containing resinous material accumulated from prior processing operations by:
   introducing a solvent into the reaction vessel;
   contacting the resinous material with the solvent;
   removing the resinous material from the reaction vessel walls; and
   wiping the solvent containing the resinous material in thin film form on the surface of revolution.

3. The method of claim 1 wherein the resinous material is a vinyl resin and the solvent is a cyclic hydrocarbon.

4. The method of claim 3 wherein the vinyl resin is polyvinyl chloride and the cyclic hydrocarbon is tetrahydrofuran.

5. The method of claim 4 which includes dissolving the polyvinyl chloride in the tetrahydrofuran prior to placing the solvent in thin film form on the surface of revolution.

6. The method of claim 1 wherein the resinous material is a vinyl chloride resin and the solvent is tetrahydrofuran and which includes dissolving the polyvinyl chloride in the tetrahydrofuran at a temperature of between 120 and 150° F. prior to placing the solvent in thin film form on the surface of revolution and further wherein 99 percent of the solvent is recovered as a vapor stream.

7. The method of claim 6 wherein the vinyl chloride resin is recovered at a viscosity between about 25,000 to 250,000 Hz.

UNITED STATES PATENT OFFICE
CERTIFICATE OF CORRECTION

Patent No. 3,554,266              Dated January 13, 1971

Inventor(s) James L. Baird et al.

It is certified that error appears in the above-identified patent and that said Letters Patent are hereby corrected as shown below:

Column 5, lines 6 and 7, "Hz", each occurrence, should re -- cps --; Column 6, lines 17 to 20, cancel "d. conveying the viscous material from the evaporator into a product outlet; and e. positively displacing the viscous material from the product outlet;".

Signed and sealed this 15th day of June 1971.

(SEAL)
Attest:

EDWARD M. FLETCHER, JR.           WILLIAM E. SCHUYLER, JR.
Attesting Officer                 Commissioner of Patents